United States Patent [19]

Luger

[11] Patent Number: 5,292,149
[45] Date of Patent: Mar. 8, 1994

[54] ARRANGEMENT FOR THE ACTIVE ADJUSTMENT OF A MOTOR VEHICLE WHEEL

[76] Inventor: Martin Luger, Glemseckstrade 28, Leonberg, Fed. Rep. of Germany

[21] Appl. No.: 958,116
[22] PCT Filed: Jun. 15, 1991
[86] PCT No.: PCT/EP91/01114
 § 371 Date: Dec. 23, 1992
 § 102(e) Date: Dec. 23, 1992
[87] PCT Pub. No.: WO92/00201
 PCT Pub. Date: Jan. 9, 1992

[30] Foreign Application Priority Data

Jun. 28, 1990 [DE] Fed. Rep. of Germany ....... 4020547

[51] Int. Cl.$^5$ .............................................. B62D 17/00
[52] U.S. Cl. ...................................... 280/661; 280/673
[58] Field of Search ................ 280/661, 673, 91, 691, 280/690

[56] References Cited

U.S. PATENT DOCUMENTS

| | | | |
|---|---|---|---|
| 4,700,972 | 10/1987 | Young | 280/707 |
| 4,717,175 | 1/1988 | Arai et al. | 280/673 |
| 5,048,860 | 9/1991 | Kanai et al. | 280/661 |

FOREIGN PATENT DOCUMENTS

| | | | |
|---|---|---|---|
| 0265959 | 5/1988 | European Pat. Off. | 280/661 |
| 278095 | 8/1988 | European Pat. Off. . | |
| 307547 | 3/1989 | European Pat. Off. . | |
| 378028 | 7/1990 | European Pat. Off. . | |
| 2855105 | 7/1980 | Fed. Rep. of Germany . | |
| 3139792 | 4/1983 | Fed. Rep. of Germany . | |
| 0032912 | 2/1987 | Japan | 280/661 |
| 2178707 | 2/1987 | United Kingdom . | |
| 2203711 | 10/1988 | United Kingdom . | |

OTHER PUBLICATIONS

PCT Examination Report dated Aug. 13, 1992.

Primary Examiner—Margaret A. Focarino
Assistant Examiner—Christopher P. Ellis
Attorney, Agent, or Firm—Evenson, McKeown, Edwards & Lenahan

[57] ABSTRACT

An arrangement for the active adjustment of a motor vehicle wheel includes a device which has an adjusting element and in which the suspension links, independently of this device, are linked below and/or above a wheel spin axis to a wheel carrier and are pivotally held on the vehicle body. The device has an adjusting element which is connected with the wheel carrier by means of a tie rod. For forced wheel position adjustments as a function of driving parameters, the adjusting element can be adjusted about a swivel axis formed below the wheel spin axis by a wheel-carrier-side tie rod joint and a wheel-carrier-side link joint. The adjusting element of the device includes at least one hydraulic cylinder which is constructed so that it can be moved in and out while influencing the wheel adjustment by way of an electronic control unit 40 as a function of driving parameters, such as the suspension travel, the lateral acceleration, the speed, the longitudinal acceleration, the deceleration, the yawing moment, and the steering angle.

14 Claims, 8 Drawing Sheets

ARRANGEMENT FOR THE ACTIVE ADJUSTMENT OF A MOTOR VEHICLE WHEEL

BACKGROUND AND SUMMARY OF THE INVENTION

The invention relates to an arrangement for the active adjustment of a motor vehicle wheel having an adjusting element, suspension links linked to a wheel carrier, and an intermediate element for linking the adjusting element and the suspension links to the wheel carrier.

A wheel, suspension system disclosed in DE-PS 31 39 792 which shows an adjusting device for the camber change and the toe change under certain driving conditions. The adjustment takes place by way of hydraulic cylinders which are partially integrated into the link therebetween or which are formed as part of the wheel suspension link or as part of the link bearing. The adjustment elements are consequently subjected to relatively high forces which otherwise are absorbed only by the link bearings.

In Patent Document GB-A-2 203 711, an arrangement using a connecting link is shown for the control of the camber of the rear wheels for vehicles with four steerable rear wheels. This connecting link is pivotally fastened to the vehicle body and has a central swivel bearing for a suspension link supported and disposed on the wheel carrier. A hydraulic cylinder, which is constructed as an adjusting element and which causes the camber change of the wheel by way of the connecting link, is applied to the lower end of the connecting link facing away from the bearing of the body.

It is an object of the invention to provide a wheel suspension system for a motor vehicle which has a wheel adjusting device that requires little space, has a favorable response characteristic and is not subject to excessive forces.

According to the invention, this object is achieved by an arrangement for the active camber and/or toe adjustment of a motor vehicle wheel by a way of and adjusting device comprising an adjusting element in which suspension links are linked to a wheel carrier, are swivellably held on the vehicle body and the adjusting element, by way of a connecting intermediate element, is connected with the wheel carrier while acting upon it in an adjusting manner, wherein the intermediate element, by way of a central ball joint, is linked directly to the wheel carrier in a tiltable manner, and a control rod of the adjusting device is connected with a first bearing, and the suspension link is connected with a second bearing, the adjusting device comprising a hydraulic adjusting element which is connected with the control rod and being constructed to be capable of moving in and out while influencing the position of the wheel by way of an electronic control unit for forced wheel position changes as a function of driving parameters, such as suspension travel, lateral acceleration, the speed, the longitudinal acceleration, deceleration, yawings and steering angles and wherein the wheel is adjustable about a swivel axis formed below the wheel spin axis by a wheel-carrier-side tie rod joint and a wheel-carrier-side link joint.

According further to the present invention, the control rod can be held on the intermediate element which is linked to the wheel carrier and which holds on its upper free end the control rod in the swivel bearing with an axis in an articulated manner, and supports on its lower free end the suspension in the bearing with a swivel axis.

According further to the present invention, the control rod can be held on an intermediate element which is linked to the wheel carrier and which supports on an upper free end of the intermediate element the suspension link in the swivel bearing and holds on a lower free end of the intermediate element the control rod in the bearing in an articulated manner.

According further to present invention, between the adjusting element and the control rod, an intermediate lever is arranged which comprises two arms which are disposed at an angle with respect to one another. The intermediate lever with the arms which are disposed at different angles with respect to one another can be assigned to each wheel side of an axle between the control rod and the adjusting link.

According further to the present invention, the setting on the swivel shaft can be determined by the position of the wheel-carrier-side joint of the lower suspension link and by the position of wheel-carrier-side joint of the tie rod and a ratio of the camera to the toe-in on the wheel can be determined in a defined manner.

According further to the present invention, the swivel axis has a setting of alpha $\alpha = 90°$ for achieving a toe-in adjustment on the wheel.

According further to the present invention, the adjusting element is disposed in a plane arranged below the wheel spin axis and is connected with a two-arm lever which extends in an approximately vertical plane and is connected by means of its free end facing away from the bearing of the adjusting element with the control rod which is linked to the wheel carrier by way of the bearing above the wheel spin axis.

According further to the present invention, an adjusting device for absorbing the suspension travel is connected with the suspension link of each wheel side of an axle arranged below the wheel spin axis, the adjusting device being connected by way of one pressure pipe respectively with a chamber of the hydraulic cylinder.

The principal advantages achieved by the invention are that by the linking of the suspension element to the wheel carrier, which is separate from the control rod of the adjusting device, the forces, particularly the longitudinal forces, can also be absorbed separately, so that a wheel adjustment, such as a camber, a toe-in and a toe-out, is to be carried out which is not affected by it. As a result, a faster build-up of side force takes place, particularly during cornering and/or lane changes. During straight-ahead driving and particularly in connection with high speeds, a lower tire pressure may be used as a result of minimal wheel adjustment changes by way of the spring deflection, which clearly increases the comfort level.

The adjusting device for the wheels of an axle is constructed such that is can be used for the rear axles as well as for the front axles. A wheel adjustment takes place in a simple manner by way of a hydraulic cylinder, but may also take place by way of a motor, such as an electric motor or a motor that is driven in another manner.

By way of a rocker lever disposed on the wheel carrier by means of a ball joint, the control rod of the adjusting device as well as a suspension link are arranged to be pivotable about a horizontal axis which extends in the longitudinal direction of the vehicle. This double bearing results in an absorbing of the longitudinal forces only by way of the link bearing, and the tie rod bearing is free of loads resulting from these forces.

The connection of the control rod of the adjusting device with the adjusting link may take place by means of a two-armed supported lever. This lever then provides the possibility of determining the wheel adjusting paths in which the angle between the two lever arms, which are at an angle, is enlarged or reduced. As a result, the wheels can be adjusted in different fashions during the driving operation which is an advantage particularly during cornering in order to build up different cornering forces.

The adjusting device is also suitable for vehicles with rear wheel steering in the case of which, by way of the lower suspension link, a tie rod for a steering gear is also held on the wheel carrier.

In the case of vehicles with a rear engine, there is, for reasons of space, no room for an adjusting device arranged above the wheel spin axis. This adjusting device will then be arranged below the wheel spin axis, and a connection with the control rod arranged above the wheel spin axis will then take place by means of a deflecting lever.

The adjusting element, such as a hydraulic cylinder or a motor, may be controlled by means of an electronic control unit which processes the individual driving parameters. The individual driving parameters may be used as well as especially combined driving parameters and all driving parameters together.

As a function of the wheel adjustment with respect to suspension movements of the wheel, the lower suspension link, for example, may be connected with a device which absorbs the spring travel and correspondingly controls the hydraulic cylinder to carry out wheel adjustment changes.

Other objects, advantages and novel features of the present invention will become apparent from the following detailed description of the invention when considered in conjunction with the accompanying drawings.

DETAILED DESCRIPTION OF THE DRAWINGS

Figure 1:
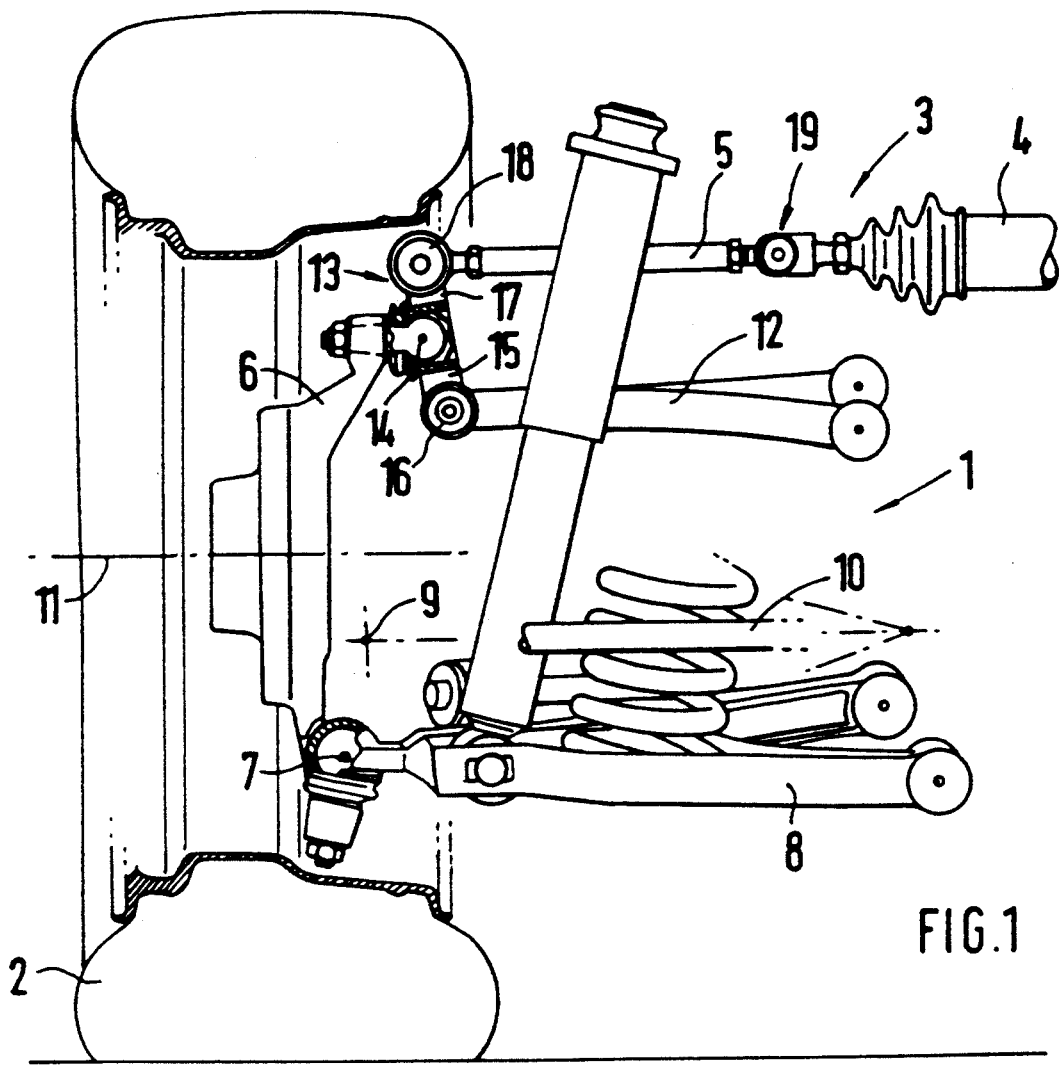
FIG. 1 is a frontal view of a wheel suspension system with an adjusting device according to an exemplary embodiment of the invention.

For the active adjustment of the wheels 2 of an axle in the toe-in and toe-out as well as the camber direction, a wheel suspension system 1 comprises a device 3 with an adjusting element 4 which engages on the wheel carrier 6 by way of a control rod 5. A swivelling of the wheel 2 takes place about an axis X—X which is determined by a joint 7 of a lower wheel suspension link 8 as well as by a joint 9 of a tie rod 10. This axis X—X may be set at an angle $\alpha$ of 0° to 90° corresponding to the desired adjusting values.

Figure 2:
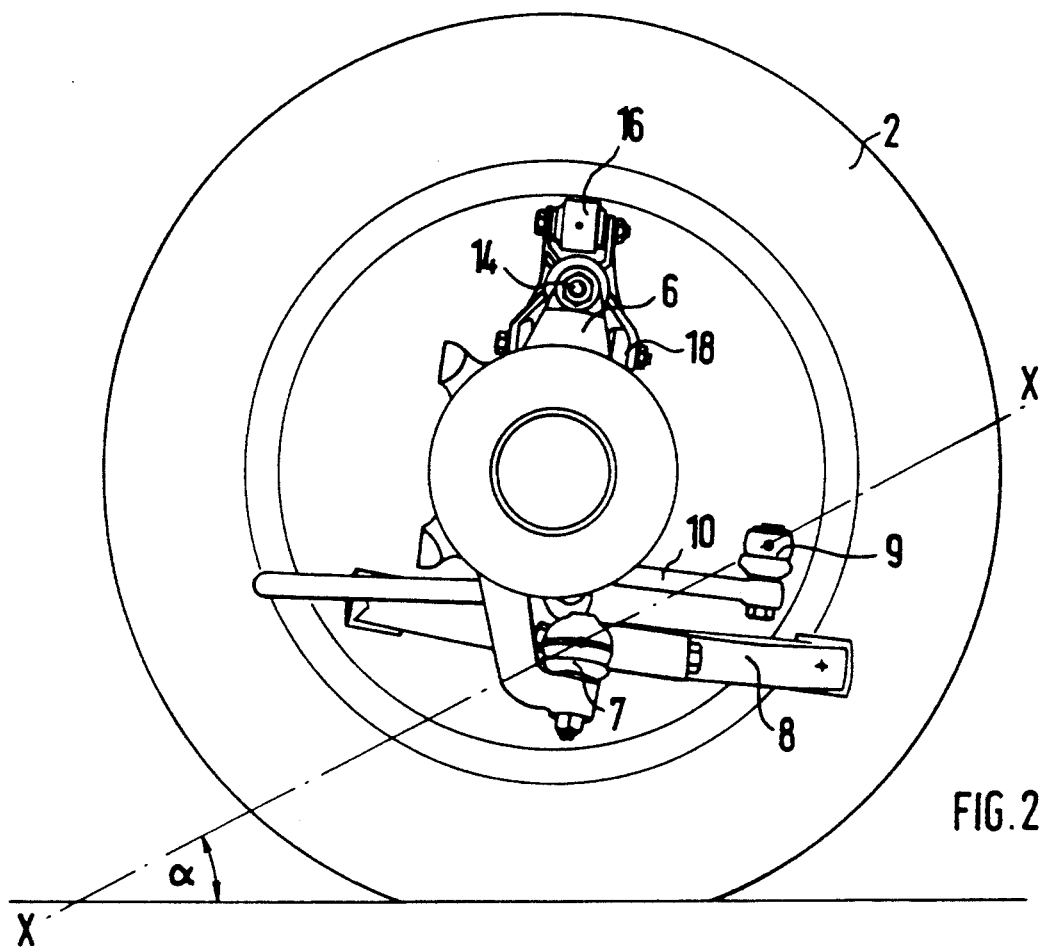
FIG. 2 is a lateral view of the wheel suspension system according to FIG. 1 with an illustrated swivel axis according to an exemplary embodiment of the invention.
Figure 2A:
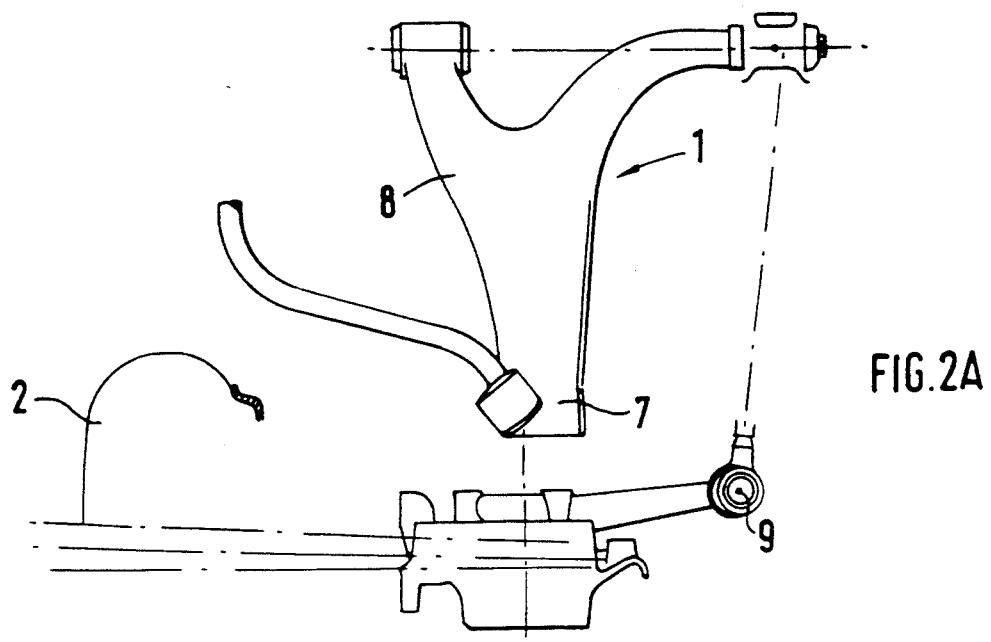
FIG. 2a is a top view of the wheel suspension system according to FIGS. 1 and 2.
Figure 3:
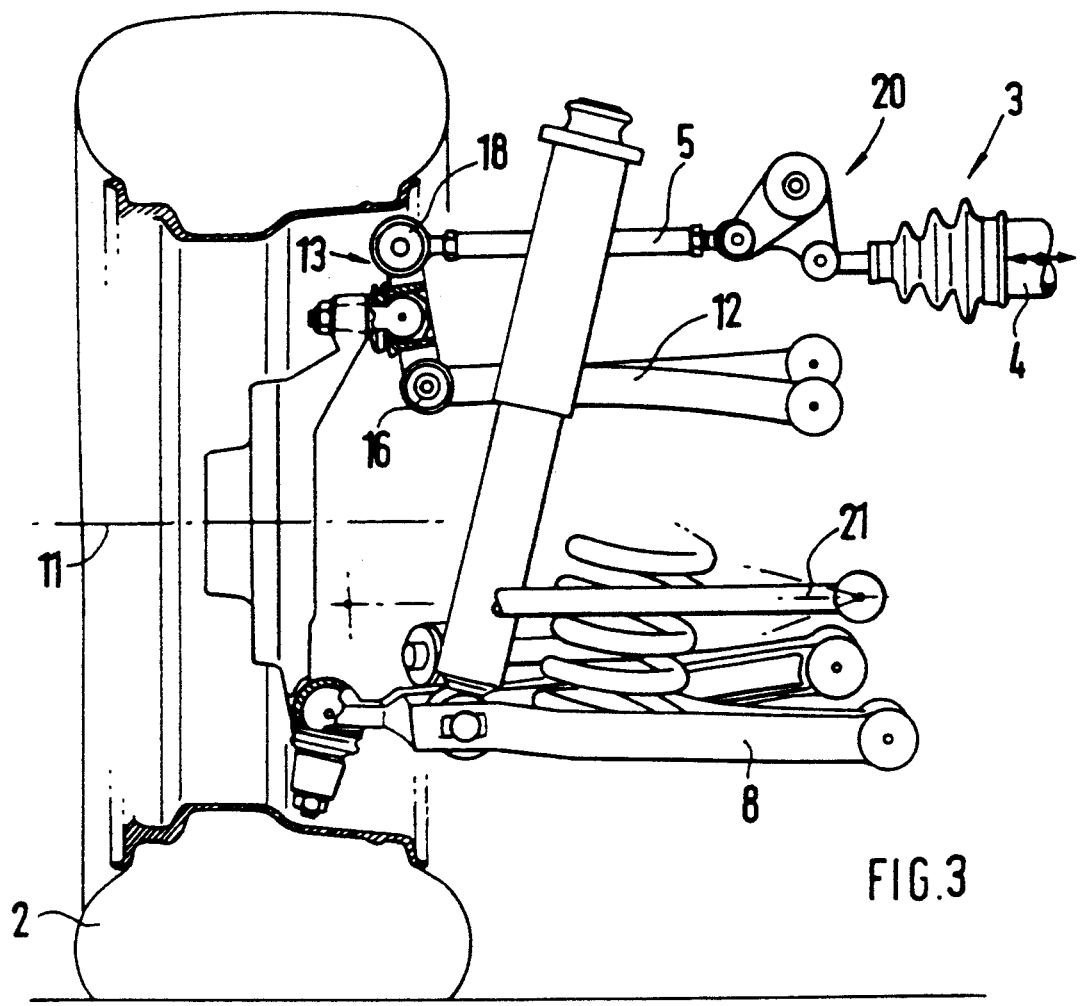
FIG. 3 is a frontal view of an exemplary embodiment of a wheel suspension system according to FIG. 1 with a two-armed lever between the adjusting element and the control rod according to an exemplary embodiment of the invention.
Figure 5:
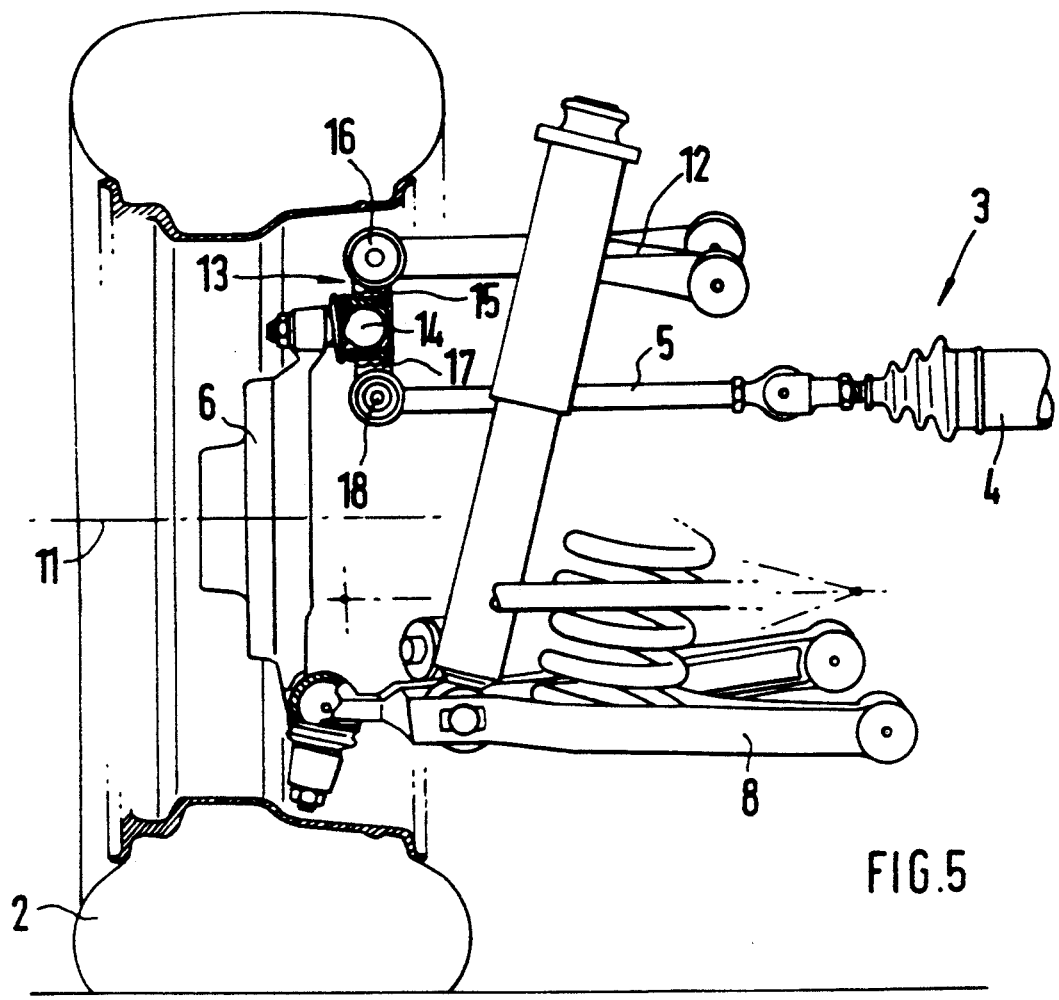
FIG. 5 is a frontal view of another exemplary embodiment of the invention showing a wheel suspension system with an adjusting device arranged below the upper suspension link.

According to the embodiments of FIGS. 1 to 3, the control rod 5 of the adjusting device 3 is arranged to be situated above the wheel spin axis 11 and adjacent to the upper suspension link 12. In the case of this embodiment, the tie rod 5 of the adjusting device 3 is provided in a plane above the suspension link 12. Together with the adjusting device 3, it may also be arranged in a plane below the upper suspension link 12 which is shown in detail particularly in FIG. 5.

The control rod 5 as well as the upper suspension link 12 are held on the wheel carrier 6 by way of a rocker arm element 13 which is connected with the wheel carrier 6 by way of a joint 14. For the connecting of the control rod 5 with this element 13, a swivel bearing 16 is provided on the free end of the first lever arm 15 with a position 18 that is aligned in the longitudinal direction of the vehicle and in an approximately horizontal manner. The suspension link 12 is supported on the free end of the second lever arm 17 by way of another swivel bearing 18 which is approximately correspondingly aligned.

Figure 4:
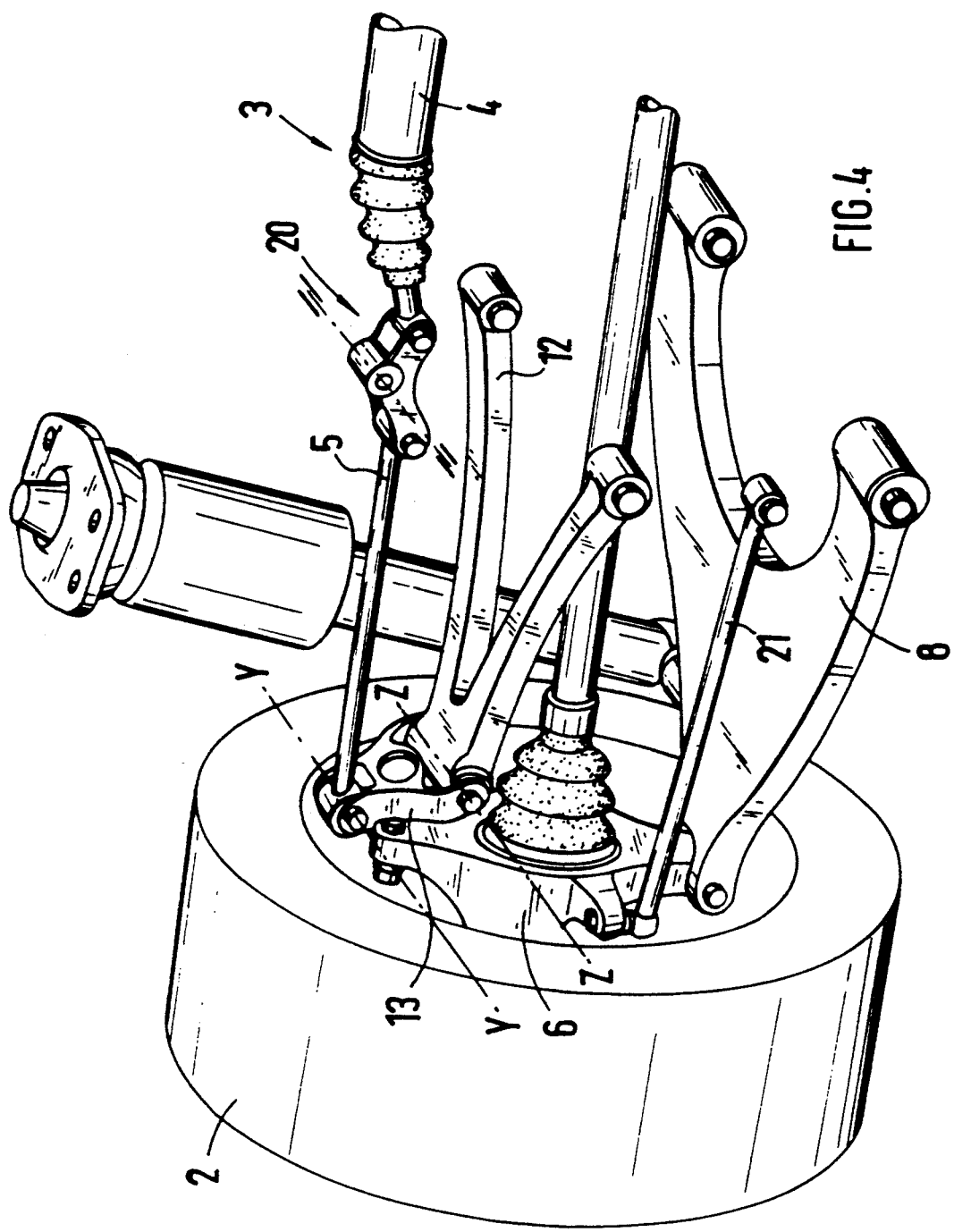
FIG. 4 is a diagrammatic representation of the wheel suspension system according to FIG. 3.
Figure 6:
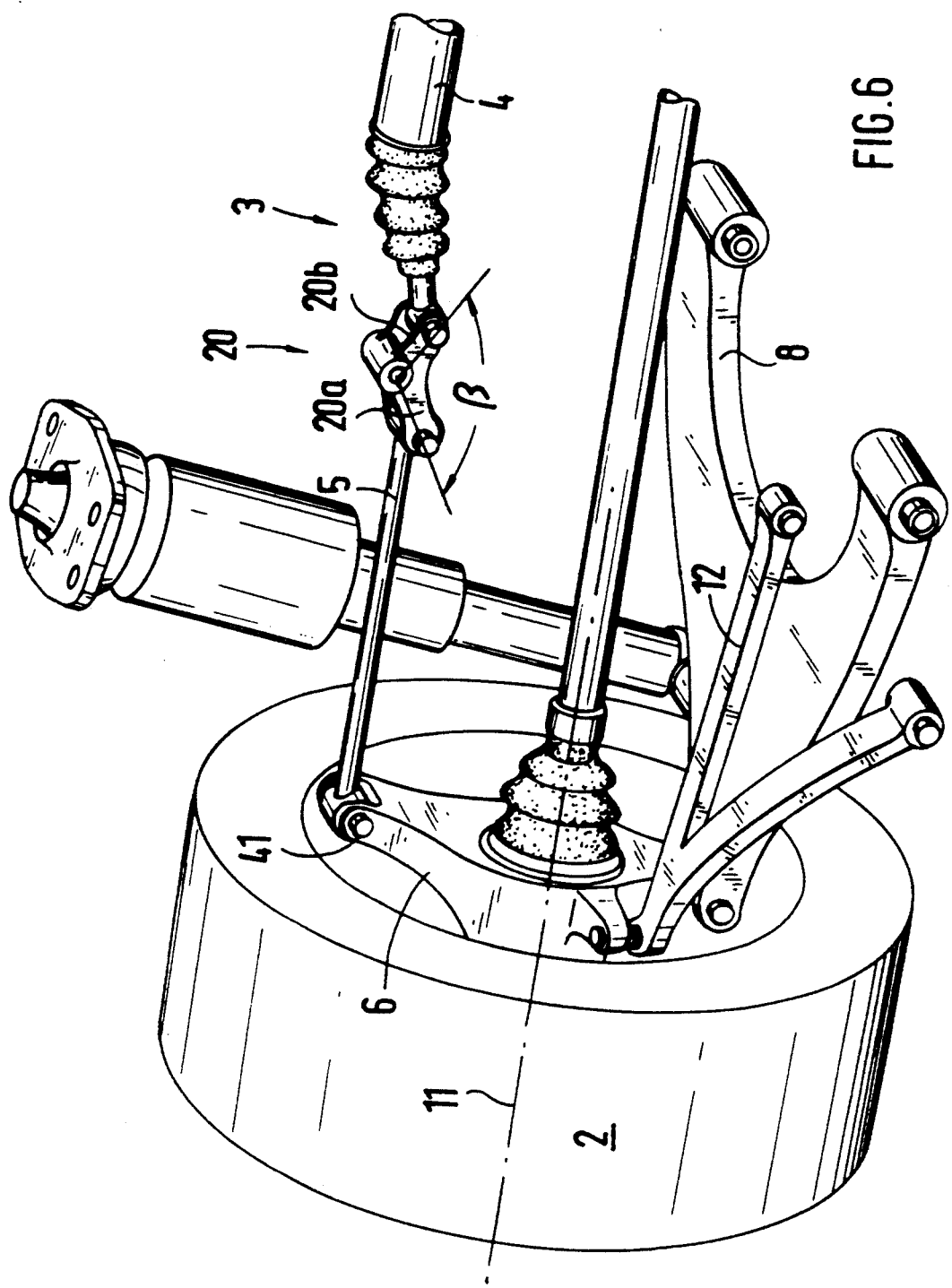
FIG. 6 is a view of another exemplary embodiment of the invention showing a wheel suspension system with two suspension links arranged below the wheel spin axis.

The connection between the control rod 5 and the adjusting element 4 takes place either by way of a simple joint 19, as shown, for example, in FIG. 1, or by way of a two-armed intermediate lever 20 with two arms 20a and 20b which are disposed at an angle $\beta$, as illustrated in FIGS. 3, 4 and 6.

According to FIG. 3, the control rod 5 is connected on the wheel carrier side on the rocker arm element 13 with the adjusting element 4 by way of the lever 20 with the two arms 20a and 20b, which is shown diagrammatically in FIG. 4. This linking of the tie rod 5 permits an almost linear shifting of the control rod 5. The tie rod 21 which is connected below the wheel spin axis 11 on the wheel carrier 6 is connected with a steering gear which is not shown in detail.

According to the embodiment of FIG. 6, the suspension links 12 and 8 are arranged below the wheel spin axis 11 while being disposed above one another at a distance from one another, and the control rod 5 with the adjusting element 4 is provided above the wheel spin axis 11.

Figure 7:
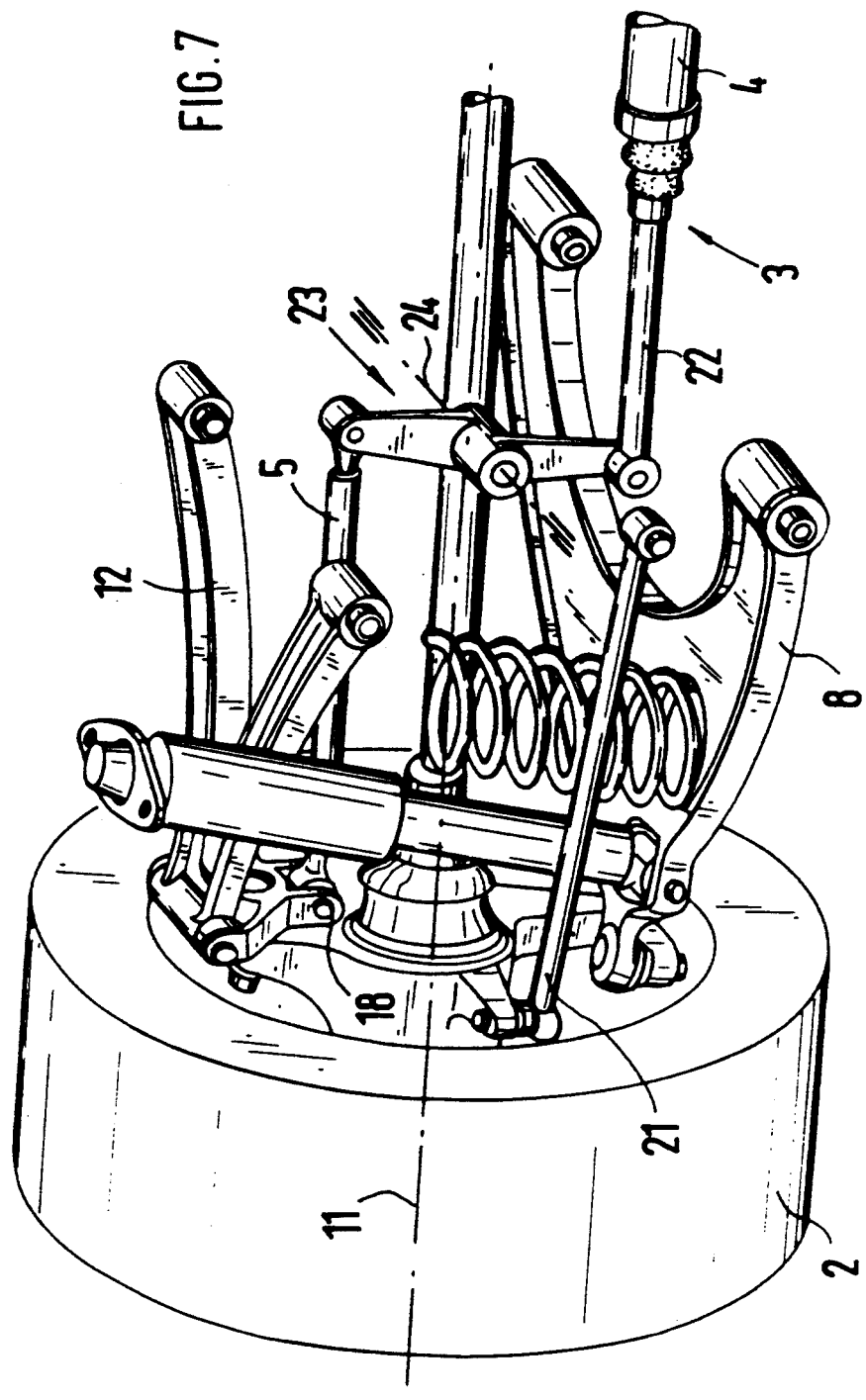
FIG. 7 is a view of another exemplary embodiment of the invention showing a wheel suspension system for a vehicle having a rear engine, in which the adjusting element is arranged below the wheel spin axis.

According to another embodiment according to FIG. 7, for achieving a clearance for the receiving of a motor between the wheels 2 of an axle, the adjusting device 3 with the adjusting element 4 is displaced in a plane below the wheel spin axis 11, in which case the control rod 5 of the device 3 is situated in a plane above the wheel spin axis 11. A connection of a piston rod 22 of the adjusting element 4 with the rod 5 takes place by way of an approximately vertically standing two-armed lever 23 which can be swivelled about an axis 24 which is aligned horizontally in the longitudinal direction of the vehicle.

A wheel position change takes place as a function of driving parameters, such as the steering angle, the speed, the lateral acceleration, the longitudinal deceleration, the longitudinal acceleration, the yawing moment and the suspension. The adjusting element 4, for example, the hydraulic cylinder or a motor, can be controlled corresponding to these parameters. According to one embodiment, an adjusting element 4 is assigned to each wheel 2 of an axle. As a result, it becomes possible to adjust each wheel 2 separately, according to the requirements, for example, during cornering.

A separate adjustment of the wheels 2 of an axle is also achieved by means of the two-armed lever 20 between the control rod 5 and the adjusting element 4 in that the two arms 20a and 20b of the lever 20 are set at different angles β with respect to one another and thus a different path transmission ratio is obtained from the left to the right wheel.

Figure 8:
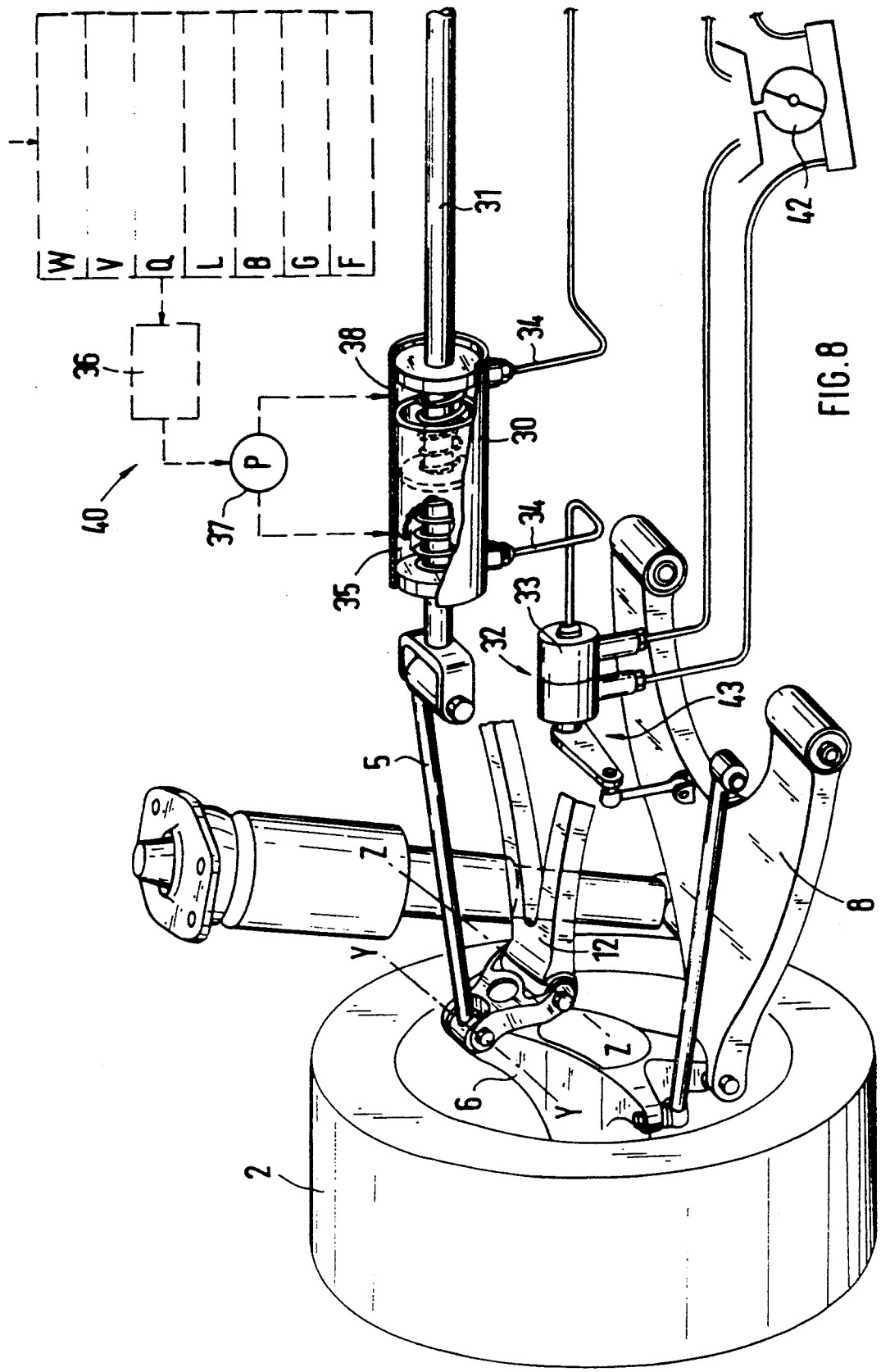
FIG. 8 is a representation of an adjusting device with a possible control by way of an electronic control unit illustrated by interrupted lines and in a further exemplary embodiment of the invention showing by way of a suspension adjusting arrangement illustrated by solid lines.

Furthermore, as indicated in FIG. 8, it is also possible to use a double-acting hydraulic cylinder 30 as the adjusting element 4. This adjusting element 4 has a continuous piston rod 31 which is connected to the control rod 5 of the two wheels 2 of an axle. According to a first embodiment of the control, indicated in FIG. 8 by solid lines, the lower suspension link 8 has an adjusting device 43 absorbing the spring travel. This adjusting device 43 comprises one pressure pipe 34 respectively which starts out from a pressure intensifying device 33 and leads in each case into a chamber 35 of the double-acting hydraulic cylinder, in which case the pressure of the medium causes a displacement of the piston and therefore a wheel adjustment.

According to another embodiment, an electronic control unit 40 is illustrated in FIG. 8 by interrupted lines. This electronic control unit 40 essentially comprises a control device 36 to which the driving parameters are fed individually, combined or all together and from which, on the output side, corresponding signals are supplied to the pump 37 which then leads the medium to the two chambers 35 and 38. Since, in the case of rear wheel steering, these driving parameters are available on the vehicle, it is possible without any high expenditures to adjust the wheels of an axle as a function of these parameters.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An arrangement for the active camber and toe adjustment of a motor vehicle wheel by way of an adjusting device comprising an adjusting element, in which suspension links are linked to a wheel carrier, and swivellably held on the vehicle body, said adjusting element, by way of a connected intermediate element is connected with the wheel carrier while acting upon the wheel carrier in an adjusting manner, wherein the intermediate element, by way of a central ball joint, is linked directly to the wheel carrier in a tiltable manner, and a control rod of the adjusting device is connected with a first bearing, and the suspension link is connected with a second bearing, the adjusting device comprising a hydraulic adjusting element which is connected with the control rod and being constructed to be capable of moving in and out while influencing the position of the wheel by way of an electronic control unit for forced wheel position changes as a function of driving parameters, including at least one of: the suspension travel, the lateral acceleration, the speed, the longitudinal acceleration, the deceleration, yawings and steering angles, and wherein the wheel is adjustable about a swivel axis formed below the wheel spin axis by a wheel-carrier-side tie rod joint and a wheel-carrier-side link joint.

2. An arrangement according to claim 1, wherein the control rod is held on the intermediate element which is linked to the wheel carrier and which holds on an upper free end of the intermediate element the control rod in the swivel bearing with an axis in an articulated manner, and supports on a lower free end of the intermediate element the suspension link in the bearing with a swivel axis.

3. An arrangement according to claim 1, wherein the control rod is held on the intermediate element which is linked to the wheel carrier and which supports on an lower free end of the intermediate element the suspension link in the swivel bearing, and holds on a upper free end of the intermediate element the control rod in the bearing in an articulated manner.

4. An arrangement according to claim 1, wherein between the adjusting element and the control rod, an intermediate lever is arranged which comprises two arms which are disposed at an angle with respect to one another.

5. An arrangement according to claim 4, wherein the intermediate lever with the arms which are disposed at different angles with respect to one another, is assigned to each wheel side of an axle between the control rod and the adjusting link.

6. An arrangement according to claim 1, wherein the setting of the swivel shaft can be determined by the position of the wheel-carrier-side joint of the lower suspension link and by the position of the wheel-carrier-side joint of the tie rod, and a ratio of the camber to the toe-in on the wheel can be determined in a defined manner.

7. An arrangement according to claim 1 wherein the swivel axis has a setting of $\alpha = 90°$ for achieving a toe-in adjustment on the wheel.

8. An arrangement according to claim 1, wherein the adjusting element is disposed in a plane arranged below the wheel spin axis and is connected with a two-armed lever which extends in an approximately vertical plane and is connected by means of its free end facing away from the bearing of the adjusting element with the control ord which is linked to the wheel carrier by way of the bearing above the wheel spin axis.

9. An arrangement according to claim 1, wherein an adjusting device for absorbing the suspension travel is connected with the suspension line of each wheel side of an axle arranged below the wheel spin axis, the adjusting device being connected by way of one pressure pipe respectively with a chamber of the hydraulic cylinder.

10. An arrangement according to claim 8, wherein, an adjusting device for absorbing the suspension travel is connected with the suspension link of each wheel side of an axle arranged below the wheel spin axis, the adjusting device being connected by way of one pressure pipe respectively with a chamber of the hydraulic cylinder.

11. An arrangement according to claim 3, wherein between the adjusting element and the control rod, an intermediate lever is arranged which comprises two arms which are disposed at an angle with respect to one another.

12. An arrangement according to claim 11, wherein the intermediate lever with the arms which are disposed at different angles with respect to one another, is assigned to each wheel side of an axle between the control rod and the adjusting link.

13. An arrangement according to claim 12 wherein the swivel axis has a setting of $\alpha = 90°$ for achieving a toe-in adjustment on the wheel.

14. An arrangement according to claim 6 wherein the swivel axis has a setting of $\alpha = 90°$ for achieving a toe-in adjustment on the wheel.

* * * * *